US012133090B2

United States Patent
Barker et al.

(10) Patent No.: US 12,133,090 B2
(45) Date of Patent: Oct. 29, 2024

(54) PASSIVE INTERMODULATION INTERFERENCE OPTIMIZED ANTENNA CONFIGURATION

(71) Applicant: Quintel Cayman Limited, Grand Cayman (KY)

(72) Inventors: David Edwin Barker, Cheshire (GB); Peter Chun Teck Song, San Jose, CA (US); Karl Ni, Rochester, NY (US)

(73) Assignee: Quintel Cayman Limited, Grand Cayman (KY)

( * ) Notice: Subject to any disclaimer, the term of this patent is extended or adjusted under 35 U.S.C. 154(b) by 143 days.

(21) Appl. No.: 17/720,249

(22) Filed: Apr. 13, 2022

(65) Prior Publication Data
US 2022/0338024 A1   Oct. 20, 2022

Related U.S. Application Data

(60) Provisional application No. 63/174,729, filed on Apr. 14, 2021.

(51) Int. Cl.
*H04W 16/28* (2009.01)
*H04B 1/00* (2006.01)
(Continued)

(52) U.S. Cl.
CPC .......... *H04W 16/28* (2013.01); *H04B 1/0064* (2013.01); *H01Q 3/2611* (2013.01); *H01Q 3/28* (2013.01)

(58) Field of Classification Search
CPC ... H04W 16/28; H04B 1/0064; H01Q 3/2611; H01Q 3/28
See application file for complete search history.

(56) References Cited

U.S. PATENT DOCUMENTS

| 2009/0058725 A1* | 3/2009 | Barker | H04B 7/0408 |
| | | | 342/372 |
| 2012/0264433 A1* | 10/2012 | Whinnett | H04W 36/165 |
| | | | 455/437 |

(Continued)

FOREIGN PATENT DOCUMENTS

WO    2020190185 A1    9/2020

OTHER PUBLICATIONS

International Search Report and Written Opinion mailed in corresponding PCT application No. PCT/US2022/024704 mailed on Jun. 30, 2022, 20 pages.

*Primary Examiner* — Keith Ferguson
(74) *Attorney, Agent, or Firm* — Tong, Rea, Bentley & Kim, LLC

(57) ABSTRACT

A base station system may include at least one base station radio, at least one antenna, the at least one antenna including at least a first antenna comprising a linear array of antenna elements arranged in a vertical plane, and at least a one antenna distribution network for distributing radio frequency (RF) signals as component RF signals across the linear array of antenna elements of the at least the first antenna to form at least one beam in an elevation plane. In one example, the at least the one antenna feed network applies amplitude and phase weights to the component RF signals, wherein the amplitude and phase weights are selected to minimize RF coupling between the at least the first antenna and passive intermodulation sources in a near-field of the at least the first antenna.

19 Claims, 8 Drawing Sheets

(51) Int. Cl.
*H01Q 3/26* (2006.01)
*H01Q 3/28* (2006.01)

(56) References Cited

U.S. PATENT DOCUMENTS

| | | |
|---|---|---|
| 2013/0203430 A1 | 8/2013 | Gan et al. |
| 2017/0264020 A1 | 9/2017 | Jackson et al. |
| 2019/0115650 A1 | 4/2019 | Barker et al. |
| 2019/0273315 A1 | 9/2019 | Hu et al. |
| 2019/0334636 A1* | 10/2019 | Li .................... G01R 29/10 |
| 2022/0149888 A1* | 5/2022 | Tsui .................. H04B 1/525 |

* cited by examiner

PASSIVE INTERMODULATION INTERFERENCE OPTIMIZED ANTENNA CONFIGURATION

CROSS-REFERENCE TO RELATED APPLICATIONS

This application claims priority to U.S. Provisional Patent Application Ser. No. 63/174,729, filed Apr. 14, 2021, which is herein incorporated by reference in its entirety.

FIELD OF THE DISCLOSURE

The present disclosure relates generally to cellular base station antennas, and relates more particularly to antenna systems with improved performance in locations affected by passive intermodulation interference, such as set back on rooftops of multi-story buildings.

BACKGROUND

Cellular communications operators deploy base station sites to allow the transmission and reception of voice and data services over a service area. Cellular operators provide these voice and data services using one or more RF spectrum bands using radio equipment and base station antennas for the transmission and reception of RF signals between mobile devices and the cellular network infrastructure. Many of the spectrum bands used by cellular operators are Frequency Division Duplex (FDD), meaning there is a downlink (base station transmit, Tx) sub-band and an uplink (base station receive, Rx) sub-band which are separated in the spectral domain by a duplex frequency gap. Most radio equipment will combine Tx and Rx sub-bands onto one RF connection using a duplexing filter. Such duplex filtering allows for a reduction in the quantity of physical antennas and cabling at base station sites, since both Tx and Rx sub-bands are generally within the same bandwidth of an antenna and hence can share the same physical antenna.

Mobile operators periodically add new spectrum at base station sites to address growing capacity needs and to also allow new services such as 4G and 5G to be deployed. Such new spectrum can be spectrum from what the operator already owns or has license to operate, or newly acquired spectrum from spectrum auctions or other acquisition processes. When a base station site starts transmitting in the new spectrum, the number of inter modulating spectral products which can be generated from any passive intermodulation (PIM) sources will increase. The probability that one or more of these PIM generated spectral products will fall into one or more of the base station receiver uplink sub-bands will also increase. Many mobile operators today typically have between five and ten different spectrum bands ranging from 600 MHz to 4000 MHz. As just one example, a major cellular operator in the United States may operate spectrum on the 3GPP designated bands of Band 12, Band 29, Band 14, Band 5, Band 2, Band 66, Band 30 and Band 77 at many sites.

SUMMARY

In one example, the present disclosure describes a base station system comprising at least one base station radio, at least one antenna, the at least one antenna including at least a first antenna comprising a substantially linear array of antenna elements arranged in substantially a vertical plane, and at least a one antenna distribution network for distributing radio frequency (RF) signals as component RF signals across the linear array of antenna elements of the at least the first antenna to form at least one beam in an elevation plane. In one example, the at least the one antenna feed network applies amplitude and phase weights to the component RF signals, wherein the amplitude and phase weights are selected to minimize RF coupling between the at least the first antenna and passive intermodulation sources in a near-field of the at least the first antenna. In other examples, the present disclosure describes methods of operation of such a base station system. In other examples, the present disclosure describes methods of operation of such a base station system.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
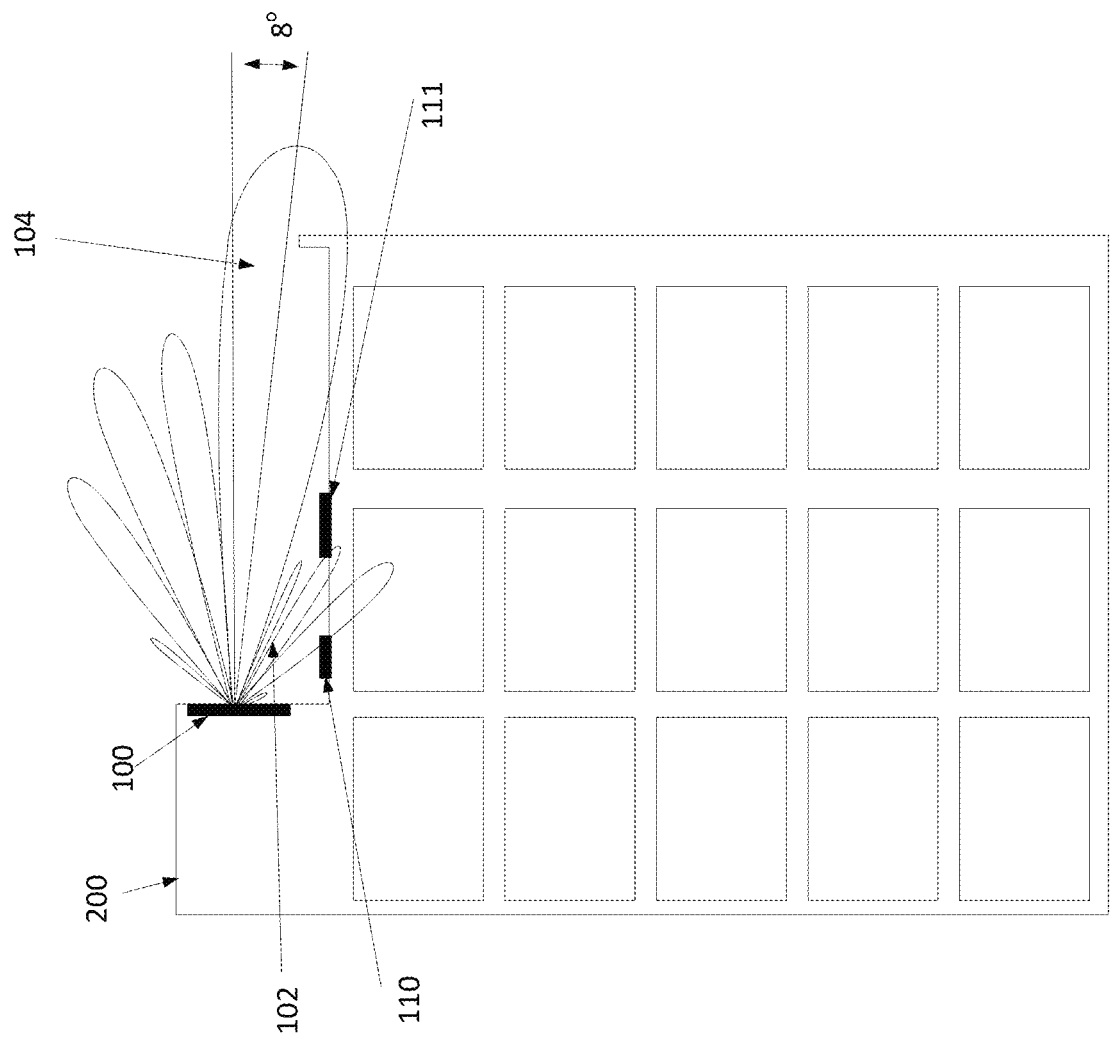
FIG. 1 depicts a base station antenna deployment example on a rooftop with PIM sources falling outside of the mainbeam.

The present disclosure describes base station antenna systems and configurations which minimize passive intermodulation (PIM) interference received on base station uplink channels which are caused by PIM sources external to the antenna system and typically in front of the antenna system and within the near field of the antenna, for antenna systems which are typically deployed on rooftop environments. Examples of the present disclosure reduce radio frequency (RF) coupling between base station antennas and PIM sources within the near field of the antenna system through optimization of the antenna distribution network amplitude and phase weights, and which are different from the amplitude and phase weights associated with elevation plane far field sidelobe suppression techniques. In one example, the present disclosure decouples downlink and uplink signals, and applies independent elevation plane tilts for the downlink and uplink signals to minimize RF coupling in the near field of the antenna system.

Cellular communications operators deploy base station sites to allow the transmission and reception of voice and data services over a service area. Cellular operators provide these voice and data services using one or more RF spectrum bands using radio equipment and base station antennas for the transmission and reception of RF signals between mobile devices and the cellular network infrastructure. Many of the spectrum bands used by cellular operators are Frequency Division Duplex (FDD), meaning there is a downlink (base station transmit, Tx) sub-band and an uplink (base station receive, Rx) sub-band which are separated in the spectral domain by a duplex frequency gap. Most radio equipment will combine Tx and Rx sub-bands onto one RF connection using a duplexing filter. Such duplex filtering allows for a reduction in the quantity of physical antennas and cabling at base station sites, since both Tx and Rx sub-bands are generally within the same bandwidth of an antenna and hence can share the same physical antenna.

Passive Intermodulation (PIM) RF energy may be generated when at least two RF signals from at least two different base station Tx sub-bands are coupled together at a junction which exhibits some non-linear electrical characteristics. Such PIM energy can fall into RF spectrum ranges outside of the Tx sub-bands; the ranges being a mathematical harmonic-related function of the signal RF transmission frequencies. In most cases, third order PIM products are the strongest which will have PIM spectral components at $2f_1 \pm f_2$ and $2f_2 \pm f_1$ for two signals at frequencies $f_1$ and $f_2$. PIM may become problematic when the resulting PIM energy (1) falls within one or more uplink or base station Rx spectrum sub-bands, and (2) is of sufficient power to desensitize the wanted RF signals arriving from mobile terminals at the base station antenna array. These non-linear junctions can be in the intended RF signal path such as RF cable connectors, RF signal combining filters, solder joints within the antenna, etc. Non-linear electrical behaviour can occur when dissimilar metals form the junction, there is non-uniform pressure across electrical contacts of the same metal, or oxidization on the junction. However, if metallic objects are present in the antenna's reactive near-field, radiating near-field, or in the radiating far-field and these metallic objects exhibit strong non-linear electrical properties (such as a rusty bolt, or chain-link fence having low-pressure metal to metal contacts), then these objects can also create and re-radiate PIM spectral products. This PIM energy can couple back into the antenna with any PIM spectral products which are co-channel with mobile terminals causing interference in the receive channel.

Mobile operators periodically add new spectrum at base station sites to address growing capacity needs and to also allow new services such as 4G and 5G to be deployed. Such new spectrum can be spectrum from what the operator already owns or has license to operate, or newly acquired spectrum from spectrum auctions or other acquisition processes. When a base station site starts transmitting in the new spectrum, the number of inter modulating spectral products which can be generated from any PIM sources will increase. The probability that one or more of these PIM generated spectral products will fall into one or more of the base station receiver uplink sub-bands will also increase. Many mobile operators today typically have between five and ten different spectrum bands ranging from 600 MHz to 4000 MHz. As just one example, a major cellular operator in the United States may operate spectrum on the 3GPP designated bands of Band 12, Band 29, Band 14, Band 5, Band 2, Band 66, Band 30 and Band 77 at many sites.

A large proportion of base station sites include those with antenna installations on rooftop sites, especially in urban areas, where rooftops may be plentiful. Many rooftop sites have their antennas set back from the rooftop edges, so they are less visible from the street, which is often a requirement of the site owner, or the local municipality zoning guidelines for deploying antennas on rooftops. Rooftop sites, however, often contain several external PIM sources which can be in front of the antennas, where the RF field strength is large. Such external PIM sources include pipework, cable conduits, cable, screws, bolts and roof fixings, ventilation ducts, HVAC equipment, handrails, lead or aluminium flashing, especially on roof parapets, and so forth. If these external PIM sources are in front of the antennas, they are also likely to be in the boresight of one or more of the antenna radiating fields.

PIM interference mitigation measures include physical removal of external PIM sources where practical, or replacement of metal fastenings with non-metallic fastenings for example. PIM mitigation may also include covering up offending metalwork sources with RF absorbing material. In more extreme cases, antennas can be re-situated on the rooftop or use adaptive PIM cancellation signal processing at the signal baseband level.

Another PIM mitigation technique is to use base station antennas which have suppressed elevation beam sidelobes in the far field which are below the mainbeam or primary lobe of the antenna's radiation pattern. Any potential PIM sources which are at subtended angles below the mainbeam may be illuminated with less RF energy than had they been with a conventional antenna, which in turn reduces the PIM energy generated at the PIM sources, plus lowers coupling back into the receiver since the elevation plane radiation patterns for transmit and receive signals will normally be very similar. Suppression of sidelobes below the mainbeam may mean compromising on other desirable features of a base station antenna such as tolerating an increase in sidelobes above the mainbeam and/or a small increase in mainlobe beam width and hence a reduction in antenna directivity or gain. This sidelobe reduction technique for PIM mitigation is depicted in FIG. 1 where a base station antenna system comprising of at least one antenna (100) (e.g., an antenna array comprising a number of antenna elements) is mounted on a building rooftop structure (200). The antenna system (100) is set back from the rooftop edges so as to minimize visual impact when viewed from the ground or street level. The main beam radiation pattern in elevation is depicted with mainlobe (104) and suppressed sidelobes (102) below the mainlobe. The beam tilt angle in this example is set at 8° which may be chosen based on optimizing for wide area service coverage footprint and inter-cell interference for the wider cellular network of cell sites. In FIG. 1, there are two PIM sources (110 and 111) which are in front of the antenna and are at locations on the rooftop outside of the main beam (104). The use of lower sidelobe suppression techniques may help reduce coupling to and from the PIM sources (110 and 111).

A disadvantage of using antennas with suppression of elevation plane sidelobes below the main beam is that suppressed sidelobes can only be considered to be established in the radiative far field of the antenna, yet the PIM sources such as those found in rooftop environments can often be well within the radiative near field. The far field of the antenna is usually defined as starting around a distance of $2D^2/\lambda$ in front of the antenna. Thus, for example, for a cellular antenna of 2 m length operating at 800 MHz ($\lambda$=0.375 m), the far field may be deemed to start beyond 21.3 m.

Figure 2:
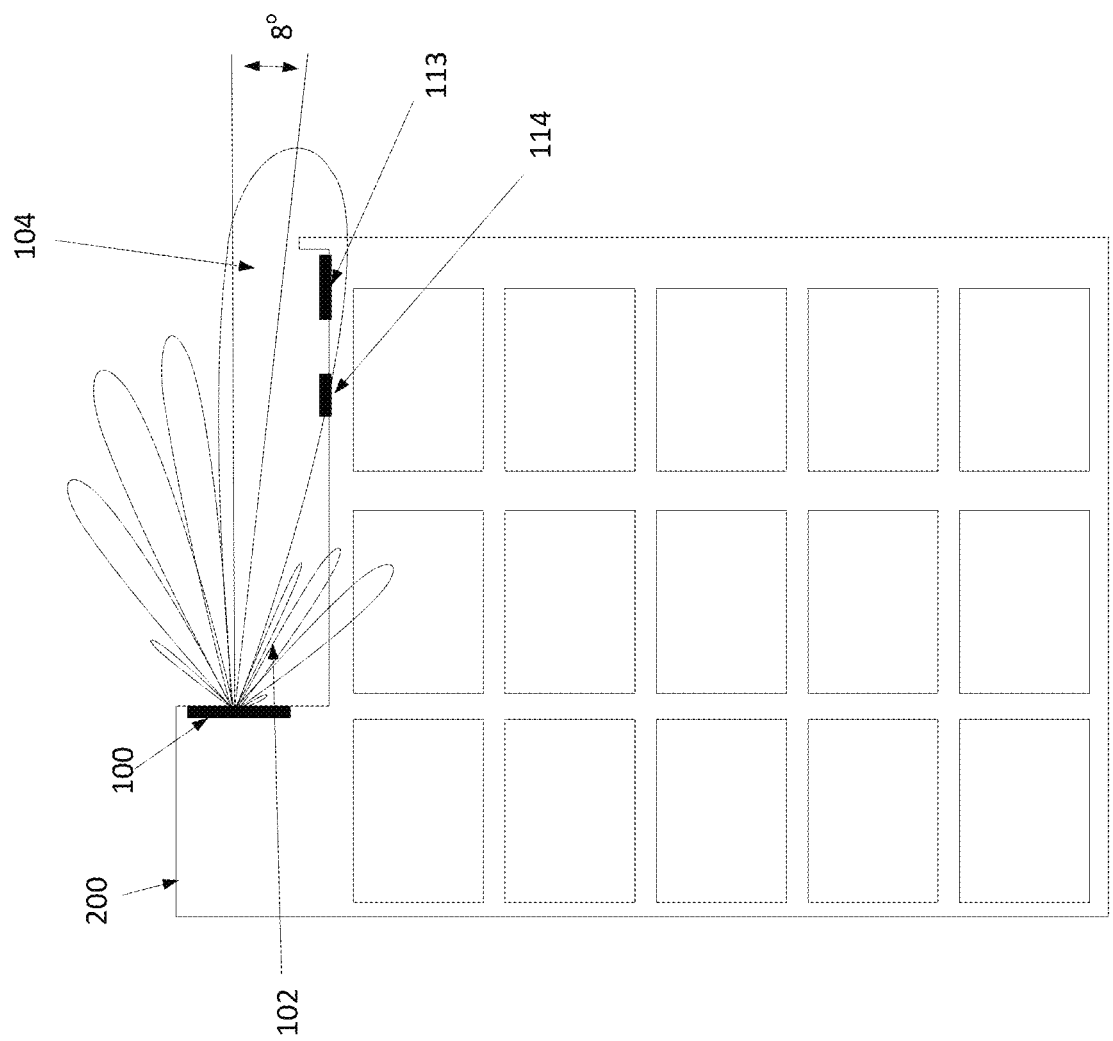
FIG. 2 depicts a base station antenna deployment example on a rooftop with PIM sources falling within the mainbeam.

In addition, if there are PIM sources which are at subtended angles which fall into the main beam of one or more of the antennas, then far-field sidelobe suppression is unable to mitigate PIM interference. This scenario is illustrated in FIG. 2, which depicts the same antenna system as shown in FIG. 1 deployed on a rooftop, but where the PIM sources (113 and 114) now fall within the mainbeam of the antenna system (100). In this regard, it should be noted that in both of the examples of FIGS. 1 and 2, the radiation patterns are representative of the far field patterns, but are not to scale with respect to the building, rooftop, or PIM sources 110, 111, 113, and 114.

Figure 3:
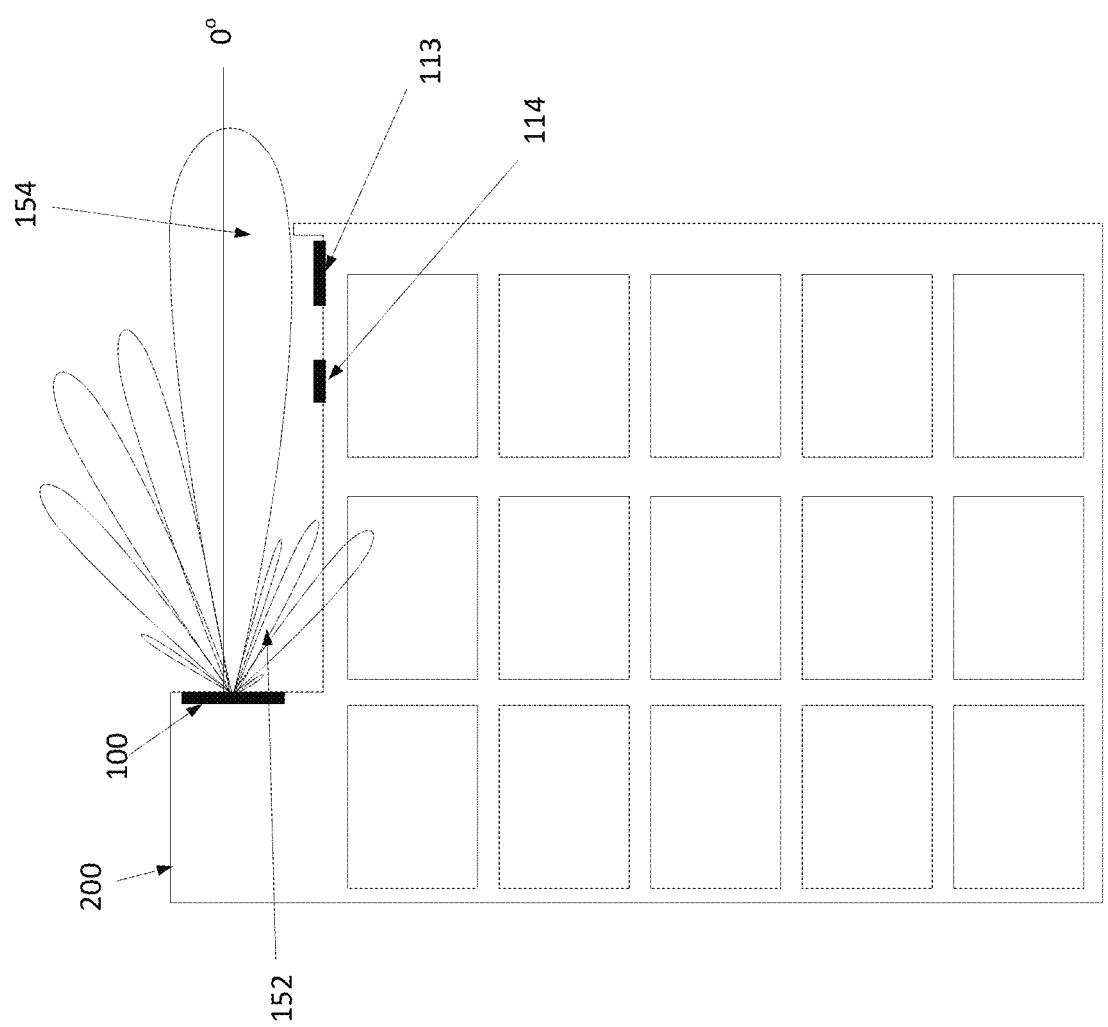
FIG. 3 depicts a base station antenna deployment example on a rooftop with adjustment of elevation beam tilt angle to place PIM sources outside of the mainbeam.

It is also possible to reduce the electrical tilt angle (shallower tilt, closer to the horizon) of the radiating beam of one or more of the antennas at the base station site with the motivation to minimize the extent or quantity of PIM sources from falling within the main beam of one or more of the antennas. This is illustrated in FIG. 3, where the antenna mainbeam is tilted at zero degrees (154), which means PIM sources (113 and 114) are subtended at angles relative to the antenna system (100) which fall into the suppressed sidelobe angular region (152) of the antenna radiation pattern.

This technique of reducing electrical tilt, however, will impact the wider cellular network, since a lower beam tilt will invariably mean an increase in co-channel interference into neighbouring cell sites which will in turn reduce spectral efficiency and the inherent capacity of the network. The reduction in the PIM interference at one of the base station sites may, however, outweigh the increase in network interference in the wider network, but nonetheless this technique is a compromise of trading localized PIM interference for wider area inter-cell interference.

Most cellular networks exhibit asymmetric traffic loading in that the downlink traffic channels typically carry significantly more data payload than the uplink traffic channels, which can be up to 10:1 in terms of downlink:uplink traffic demand. FDD systems typically use paired spectrum allocations which use symmetric RF bandwidth for downlink and uplink channels. Given that downlink traffic far exceeds uplink traffic demand, the cellular network generally becomes downlink capacity limited before becoming uplink capacity limited. Therefore, in the previous example, the impact on network capacity due to reducing tilt will be felt more strongly on the downlink channels.

A first example of the present disclosure exploits the fact that frequency division duplex (FDD) radio systems have large asymmetric traffic loading with downlink channels being capacity limited rather than the uplink channels being capacity or interference limited. In particular, the present example provides an antenna configuration with independent beam tilts for downlink and uplink channels to minimize localized external PIM coupling.

Figure 4:
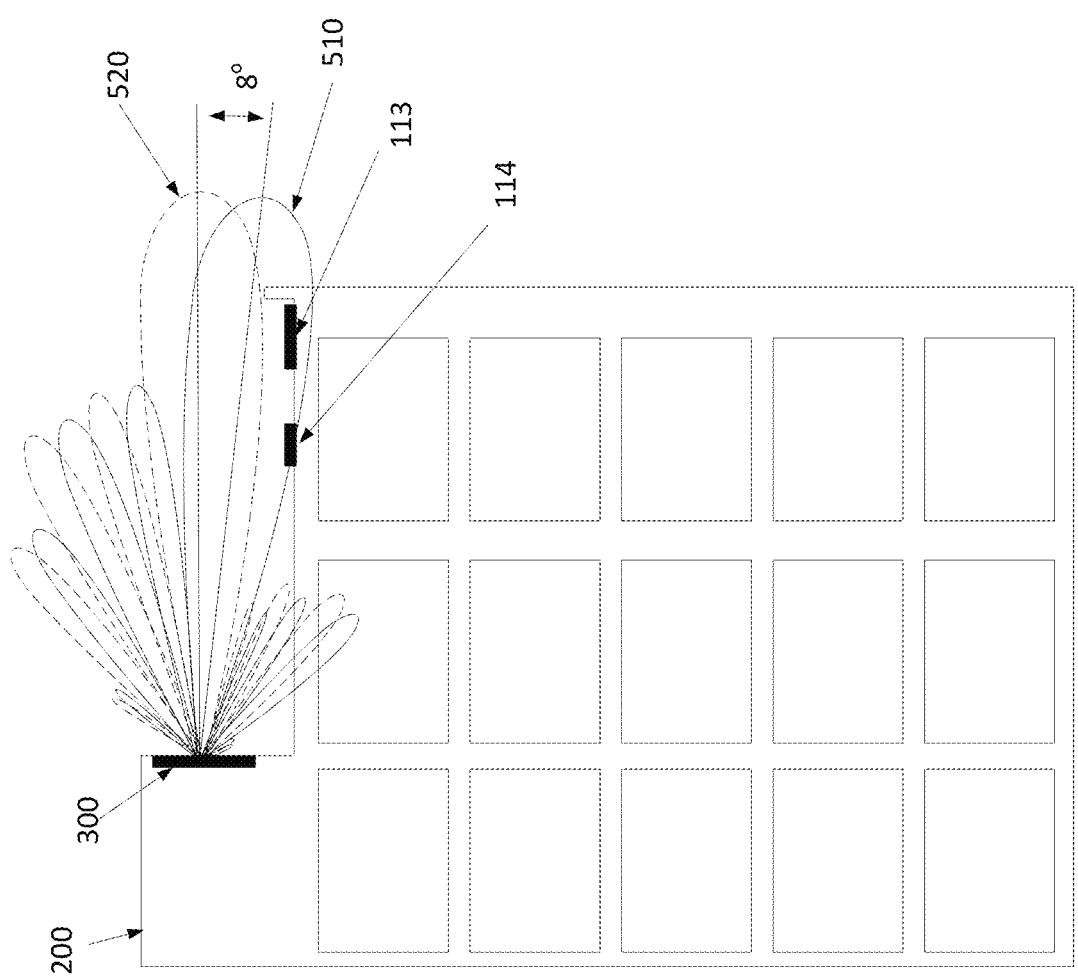
FIG. 4 depicts a base station antenna deployment example on a rooftop with independent beam tilt angles for downlink and uplink channels to minimize PIM coupling from external PIM sources.

With reference to FIG. 4, the first example is intended to allow an antenna (300) (e.g., a substantially linear array of antenna elements arranged in substantially a vertical plane) which is deployed on a rooftop and set back from the rooftop edges to have a preferred main beam tilt (398) for downlink which defines the cell coverage footprint, since the downlink channels convey cell broadcast and synchronization information, and thus maintain a preferred service footprint and downlink inter-cell interference geometry with neighbouring cell sites. The first example also permits the uplink channels to have a different beam tilt at a lower tilt angle (398) (closer to the horizon) produced by antenna (300). Notably, external PIM sources which may fall within the mainbeam of the downlink channels, now may fall outside of the mainbeam of the uplink channels and, thus, overall external PIM coupling is reduced into the base station radio receive channels. It should be noted that as referred to herein, "a substantially linear array of antenna elements" means an array of antenna elements that may be deployed in a typical antenna radome for cellular communication systems, e.g., having a length to width ratio of at least 4:1, or the like and intended for vertical deployments on a cell tower, building rooftop, or the like. Thus, such term does not exclude arrays in which some elements may be offset from an array center-line for azimuth beam-width control or the like. In addition, as referred to herein, "arranged in substantially a vertical plane" means an array of antenna elements intended for vertical deployments on a cell tower, building rooftop, or the like in which the array may be deployed with a fixed or variable mechanical tilt within a range of tilt angles that may be suitable for cellular communication systems (e.g., the array being within 10 degrees more or less of vertical such that the resulting boresight is within 10 degrees more or less of vertical (e.g., in the absence of further electrical tilt, if any)).

The reduction in the uplink beam tilt (399) relative to the downlink beam tilt (398) means that uplink inter-cell interference may be increased. However, the uplink channels are less likely to become capacity compromised due to the normally highly asymmetric traffic loading on cellular networks. In fact, many cellular systems which use aggressive downtilt to manage downlink inter-cell interference can become uplink coverage limited, meaning mobile user terminals on the cell edges can risk running out of handset transmit power headroom. A secondary benefit of adopting independent downlink and uplink tilt is that this can also be used as an additional network wide optimization parameter, regardless of localized externally coupled PIM sources to the base station antenna system.

Figure 5:
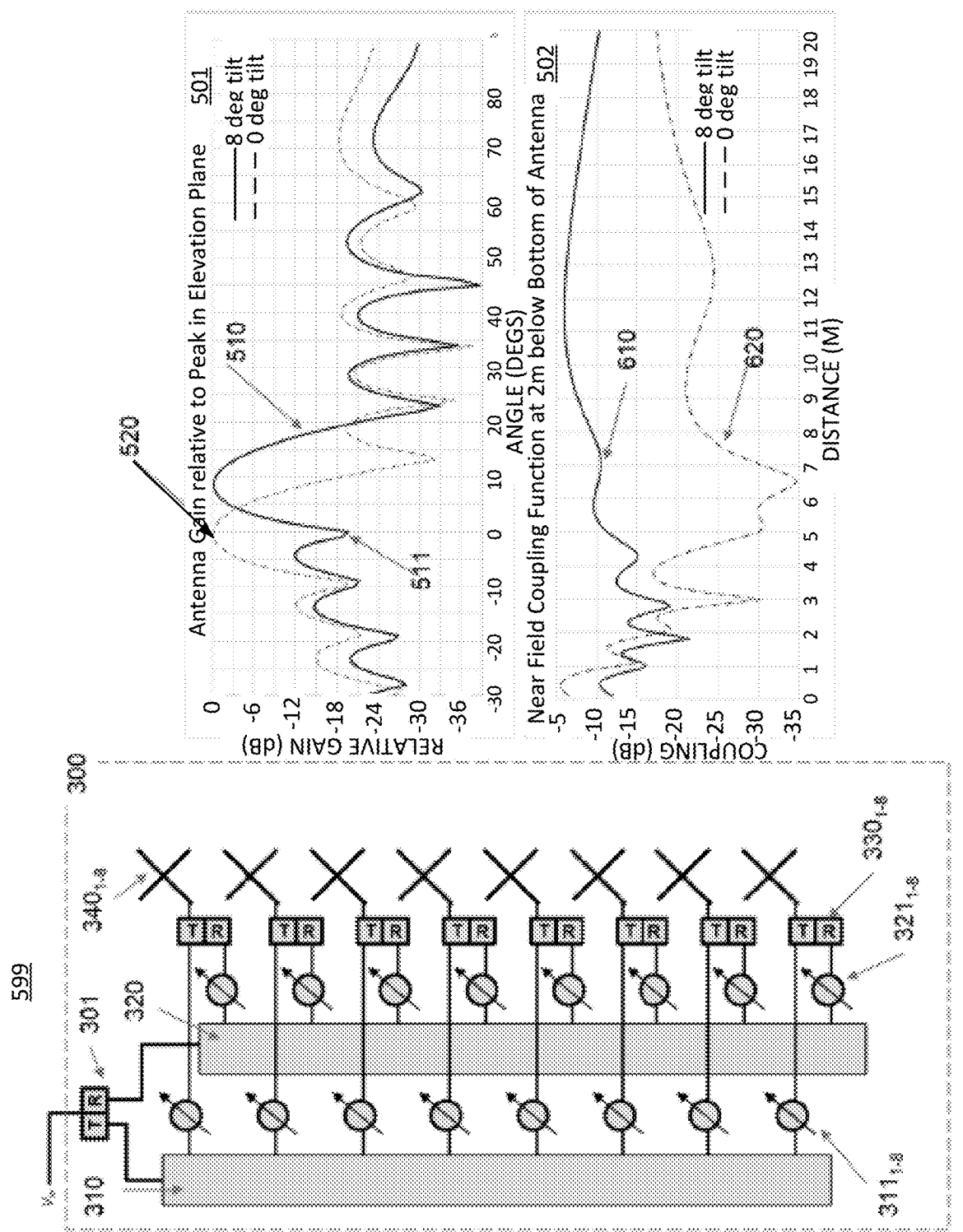
FIG. 5 depicts (1) a base station system with antenna system of the present disclosure with (2) a graph of downlink and uplink antenna relative gains as a function of elevation angle and (3) a graph of near-field coupling functions.

FIG. 5 illustrates an example apparatus (e.g., a base station system (599)) associated with the first example having independent beam tilt angles for downlink and uplink channels. As illustrated in FIG. 5, a duplexed RF signal denoted by $V_{in}$ represents a connection (e.g., of a base station radio) to an antenna system (300). The duplexed RF signal is split, via a duplex filter (301), into a transmit signal and a receive signal which carry the downlink channel and uplink channel information, respectively. The transmit signal is divided into a plurality of component transmit signals via a distribution network (310) and phase shifting network ($311_1$-$311_8$) (collectively a "feed network", or transmit feed network) which apply amplitude and phase weights to each of the plurality of component transmit signals. Similarly, the receive signal is divided into a plurality of component receive signals via a distribution network (320) and phase shifting network ($321_1$-$321_8$) (collectively a "feed network", or receive feed network) which apply amplitude and phase weights to each of the plurality of component receive signals. The component transmit signals and component receive signals are combined via a plurality of duplex filters ($330_1$-$330_8$) to create a plurality of duplexed component transmit and receive signals, which are connected to a plurality of antenna elements ($340_1$-$340_8$) arranged in an array of antenna elements. The respective phase shifting networks ($311_1$-$311_8$ and $321_1$-$321_8$) impart a variable phase delay across the component signals which will enable the antenna to deliver independent beam tilts for the transmit and receive signals. These independently tilting beams are illustrated by way of the top graph (501) in FIG. 5. The transmit signals are delivered using a beam boresight set at 8 degrees, or 8 degrees tilt angle and denoted by the far field antenna elevation relative gain response curve 510. The choice of beam tilt for the transmit signals is chosen for example to minimize co-channel RF interference into neighbouring cell sites, which can maximize spectral efficiencies and capacity. The choice of 8 degrees tilt in this example also coincides with an elevation plane null in the pattern at around 0 degrees (511), which may ensure that interference is minimized into the service areas of adjacent cell sites. The receive signals are carried using a beam boresight set at 0 degrees, or 0 degrees tilt angle and denoted by the far field antenna elevation relative gain response curve 520.

The graph (502) on the bottom of FIG. 5 illustrates the relative RF coupling functions of the antenna for distances between 0 and 20 m in front of the antenna, and at 2 m below the bottom of the antenna array. The curve 610 illustrates how the RF coupling function of the transmit signal varies with distance, and the curve 620 illustrates the how the RF coupling function of the receive signal varies with distance for an antenna deployed on a rooftop and set back at least 20 m from the rooftop edge. For an antenna operating at sub 1 GHz frequencies, all distances out to 20 m in this plot are deemed to be within the near field of the antenna. It can be seen from around 3 m in front of the antenna, the receive signal has between 5 dB and 30 dB lower coupling with the antenna than for the transmit signal. This is because of the different beam tilts for transmit and receive signals. If there are any potential PIM sources between 3 m and 20 m on the rooftop surface, then the PIM interference observed in the base station radio's receive channel will be significantly lower than had the transmit and receive signals shared the same antenna beam tilt, as would be the case with conventional base station antennas.

It should be noted that the base station system (599) of FIG. 5 includes illustrative feed networks for transmit and receive signals. However, examples of the present disclosure may include various passive or active feed network arrangements that are capable of imparting selected amplitude and phase weights to different antenna elements. In one example, the present disclosure may include active antenna arrays where amplitude and phase weights are generated prior to RF power amplification, either at low-power RF, at intermediate frequency (IF), baseband, or at user-specific baseband. In addition, insofar as the transmit and receive feed networks of the base station system (599) utilize duplexed transmit and receive signals to and from the base station radio, and to and from the antenna elements, the transmit and receive feed networks may collectively be considered a single feed network (e.g., having two constituent branches).

A potential concern with using antennas having different tilts for uplink and downlink is that there will be link imbalance which can impact power control procedures and increase interference to and from different cell sites. Mobile terminals in a cellular network adjust their transmission power for the uplink channel in response to changing multi-path radio channel conditions such that the received power at the base station site is maintained at a sufficiently strong signal strength at the base station receiver to deliver the required communications services. This power adjustment is typically achieved through closed loop power control procedures which instruct the terminal via downlink control channels to power up or power down at a rate of hundreds or even thousands of times per second in response to rapidly changing multi-path radio channel conditions. Open loop power control is also used in the cases where closed loop may be less effective (such as high-speed mobile channels where the multipath channel fading rate may be at a rate where any closed loop power control procedure is unable to track and correctly). Open loop power control is also used ahead of entering into a closed loop power control mode, or when transmitting small data payloads when the setting up of any closed loop power control procedure may take longer than sending the small data payload itself. In such open loop power control procedures, the uplink power is coarsely estimated based on the received downlink signal strength and assumes that the downlink and uplink signals are transmitted from and received by the same antenna and, hence, same or similar radiation patterns. Open loop power increments are typically added if data is not received or acknowledged, hence uplink power is re-estimated and data transfer re-attempted until the data payload is delivered, or control signalling is received such that a closed loop power control procedure can take over.

In the case where the uplink mainbeam tilt angle is different from the downlink mainbeam tilt angle, a mobile terminal may incorrectly estimate its open loop power since the radiation patterns in the elevation plane are different for uplink and downlink channels. For the case where the mobile terminal communicates with the base station at angles where the downlink channel relative gain is greater than the uplink channel gain due to antenna tilt imbalance, then the impact on the network is expected to manifest as mobile terminals underestimating initial power settings and an increase in time for the open loop power control procedure to make additional powering up adjustments to establish a reliable connection of transfer of data. For the case where the mobile terminal communicates with the base station at angles where the downlink channel relative gain is lower than the uplink channel gain, then the impact on the network is expected to manifest as mobile terminals overestimating initial power settings and, hence, also as an increase in time for the open loop power control procedure to make additional powering down adjustments to maintain a reliable connection of transfer of data. There may also be a small increase in the uplink inter-cell interference because of initial terminal power over-estimation. It is also possible to adjust offset parameters in the open loop power control algorithms available as part of the base station parameter optimization suite, which can be used to compensate for any expected delta in the estimation of mobile terminal uplink power, and thus minimize impact to the power control procedures between base station systems and mobile terminals.

Referring again to FIG. 5 and the top graph (501) illustrating the downlink and uplink antenna relative gains as a function of elevation angle, had the antenna system been deployed on a regular cell site (e.g., a standalone, non-rooftop deployment), or at the edge of a rooftop where there would be no diffractive propagation path over an edge, then the uplink and downlink channel imbalances would be representative. At angles between 8 degrees and 16 degrees, the imbalance is between 10 dB and 25 dB, which may become problematic in terms of open loop power control time delays. For an antenna deployed at 30 m height, angles of between 8 degrees and 16 degrees represent distances of between approximately 104 m and 213 m which may capture a meaningful proportion of mobile terminals. However, for the case of the current invention where the antenna system is set back from the rooftop edge, there will be diffractive path due to scattering of the RF propagation over the rooftop edge. Such a scenario means the angular function of relative gain for downlink and uplink is not appropriate to interpret, since communications via the sidelobes below the mainbeam are effectively blocked by the rooftop in the path between mobile terminals and the base station antenna. To a first order, propagation over an edge can be modelled as a secondary source of an infinite number of imaginary radiating elements each half a wavelength apart and extending upwards from the diffractive edge in a vertical plane, the imaginary elements having relative power and phase weights based on the radiative field from the radiation from the antenna at the plane of the imaginary sources. In such a scenario where there is a rooftop edge causing diffraction of the propagated RF signals, the uplink and downlink channel responses at distances beyond the diffractive edge will have channel gains which are a little more balanced. In one example, the present disclosure exploits the fact that a relatively large difference between uplink and downlink channel coupling can exist close-in to the antenna within the rooftop environment area, but beyond the diffractive rooftop edge, the imbalance between uplink and downlink will be reduced due to the diffractive propagation environment, which in turn may impact power control procedures less so than had no diffractive edge been present.

A second example of the present disclosure improves upon using base station antennas with elevation plane sidelobe suppression below the main beam for PIM coupling reduction. As discussed earlier, antennas which have suppressed sidelobes can only be considered to have established sidelobes in the far-field, which may be well beyond the distance at which PIM sources are present, especially for rooftop environments. In particular, the second example minimizes the radiative near field in front of and directly below the antenna through customized optimization of the amplitude and phase weights of the antenna's distribution network connected to the antenna array. These amplitude and phase weights may be similar to, but will be different from, the amplitude and phase weights associated with far field sidelobe reduction. For instance, the amplitude and phase weights may be selected in accordance with an optimization algorithm that may seek to minimize RF coupling to/across a surface area below the antenna and between the antenna and a rooftop edge that would fall outside of a main beam (e.g., a main transmit and/or receive beam). For instance, the optimization algorithm may provide amplitude and phase weights that minimize RF coupling in an area between 0 to 6 meters in front of the antenna, 0 to 10 meters in front of the antenna, etc. In other words, the optimization criteria for the optimization algorithm may include the area below and in front of the antenna over which to minimize near-field RF coupling. Additional criteria may include the tilt angle(s) of the main beam(s), the antenna height of deployment (e.g., how high above the rooftop), the antenna length, the distance set back from the roof edge, the existence of a parapet (and/or the height of the parapet (if any), and so forth.

Many base station antennas which are deployed on rooftop sites are of lengths ranging between 1.4 m and 2.6 m and deployed where the rooftop surface or parapet wall is typically 1.5 m or less from the bottom of the antenna, being at around head height for practical installation and maintenance reasons. In addition, such antennas are often deployed much closer to the rooftop surface and set back from the rooftop edges so as to intentionally minimize visual appearance from the street level.

Figure 6:
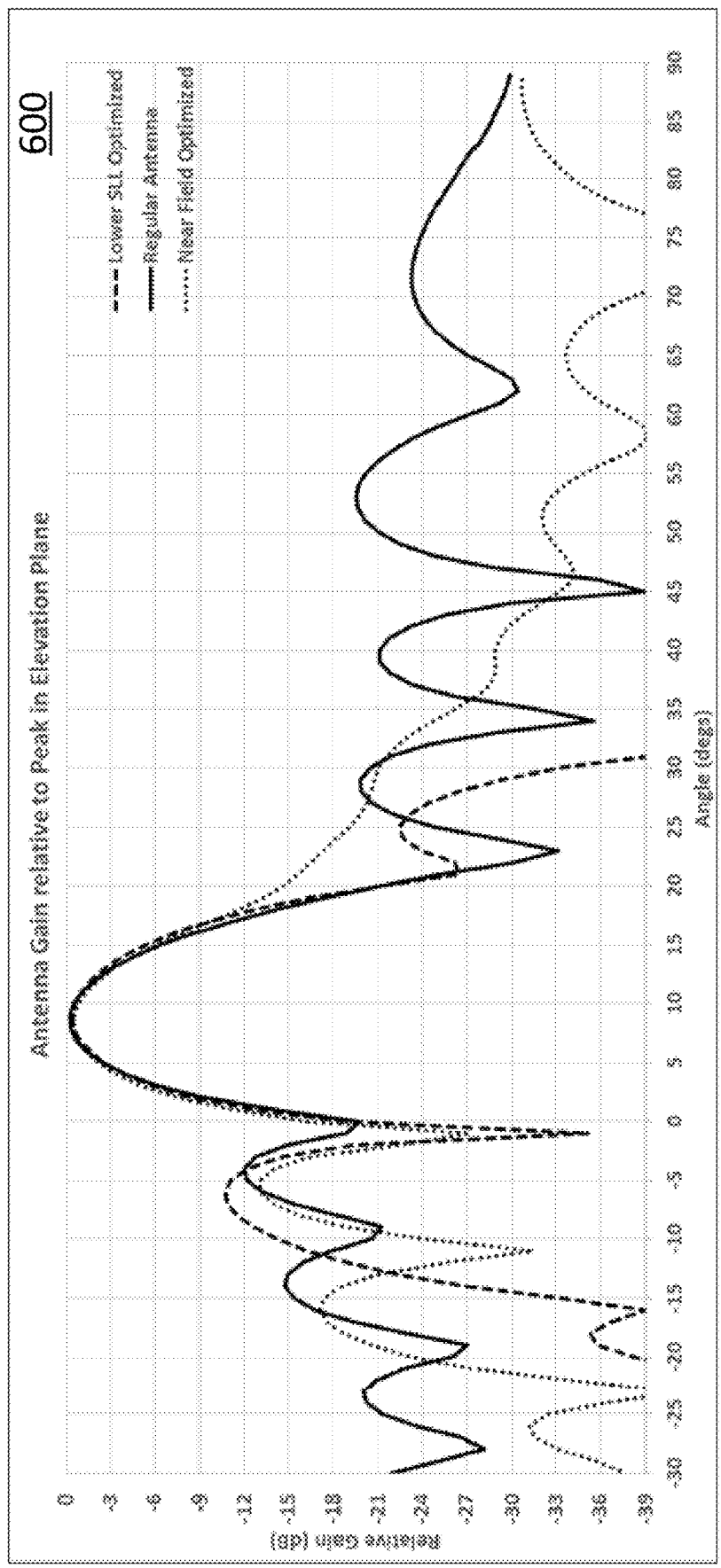
FIG. 6 illustrates elevation plane relative gain response for three differently optimized antenna distribution networks.

FIG. 6 depicts a graph (600) with three examples of different elevation patterns for a 2.4 m length base station antenna (e.g., an antenna array) which has an array of 9 radiating elements/antenna elements designed to operate in the 700 MHz band of frequencies. Each of these elevation patterns is associated with three different designs of element distribution networks. The solid curve represents the elevation pattern of an antenna array using a typical or regular antenna feed network. The intermediate dotted curve represents an antenna array using a feed network which intentionally suppresses the far field sidelobes below the main beam. The fine dotted curve represents the far field antenna elevation pattern for an antenna array using a feed network which intentionally suppresses the near field radiation projected onto a plane 2 m below the mid-point of the antenna (or 0.8 m below the bottom of the antenna), which represents where a rooftop surface may be present.

Figure 7:
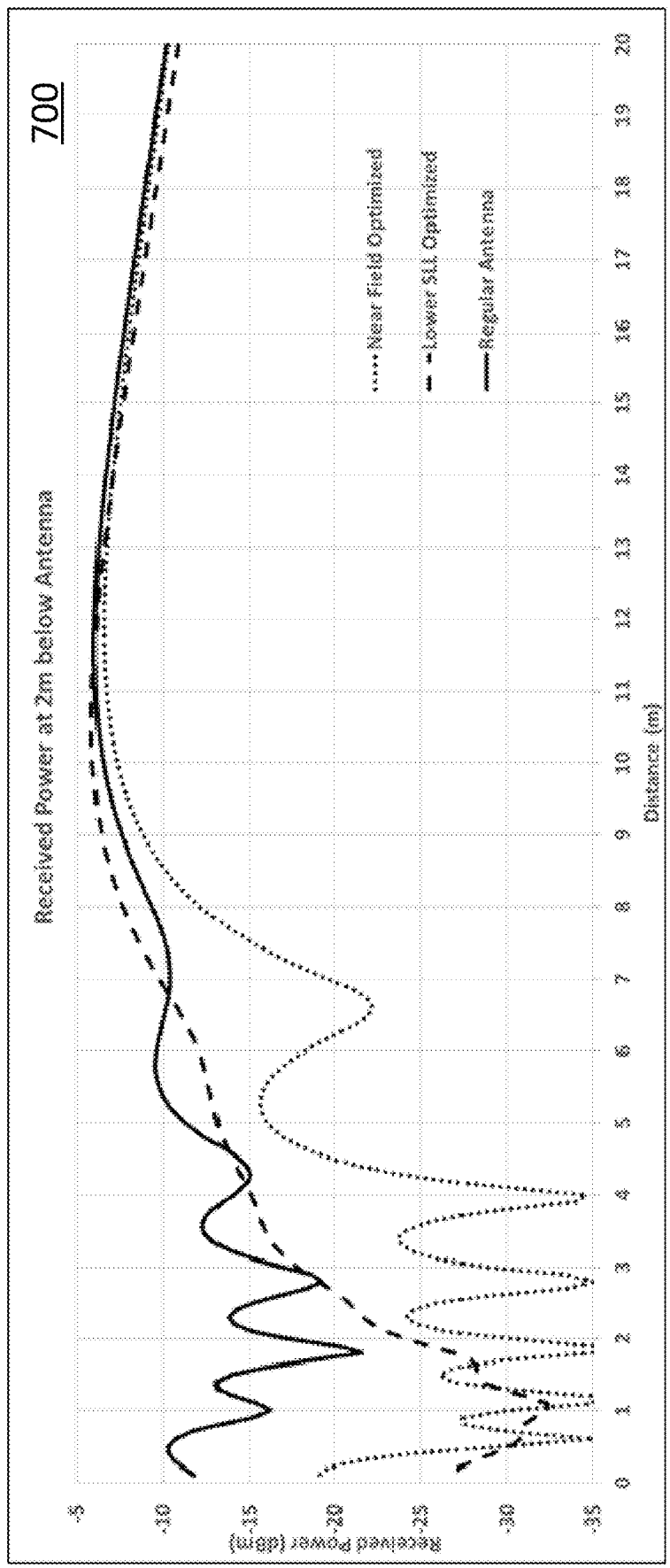
FIG. 7 illustrates RF coupling expressed as received power over a range of distances close to an antenna deployed on a rooftop for three differently optimized antenna distribution networks.

FIG. 7 depicts a graph (750) with the corresponding received power from a transmitted signal from the antenna (2.4 m in length with 9 radiating elements/antenna elements) at 2 m below the mid-point of the antenna for a distance up to 20 m from the antenna (all within the near field of the antenna for the above three antenna feed network designs). The plots are designed to illustrate the RF coupling to any potential PIM sources on a rooftop surface in front of an antenna. In this case, the fine dotted curve illustrating the RF power received from a feed network designed to suppress RF coupling close to the antenna is more optimal in minimizing coupling than a feed network designed to suppress sidelobes in the far-field (shown by the intermediate dotted curve), at least over the range of distances between 1.5 m and 10 m. For instance, a feed network providing amplitude and phase weights identified via an optimization algorithm that seeks to minimize RF coupling from 0 to 6 meters may achieve superior coupling reduction in this range (as well as up to 10 or more meters) compared to a feed network selected for lower sidelobe suppression.

A third example of the present disclosure brings together the features of the first and second embodiments and comprises an antenna that is capable of delivering independent elevation beam tilts for downlink and uplink channels, and that additionally comprises distribution networks having optimized amplitude and phase weights to minimize near-field radiative coupling with potential PIM sources which are close to the antenna. The third example is particularly effective for such potential PIM sources which might be directly below the antenna or in front of the antenna at subtended angles which are below the mainlobe of the antenna elevation radiation pattern.

Many cellular base station systems use multiple spectrum bands, which can include multiple bands. RF signals from multiple bands within a defined range of frequencies can be combined using a multiplexing filter and share the same antenna to minimize space on a cellular base station site. Such combining is, however, not recommended if the downlink transmission frequencies of these bands would lead to the generation of inter-modulation spectral components falling within the uplink channel receive bandwidth of one or more of the base station radios. It is possible to minimize the quantity of physical antennas at a base station site by separating transmission and reception paths from a plurality of duplexed base stations and then combining multiple downlink channel transmission bands together for transmission via a first antenna (e.g., an antenna array), and similarly combining multiple uplink channel receive bands for reception via a separate second antenna (e.g., an antenna array). Apart from the possibility of reducing overall antenna positions needed at a base station site, a key advantage of this configuration in separating transmission and receive paths in such a manner is that any PIM sources within the antennas do not manifest as interference in the base station receive bands, since the transmission and reception bands have been separated. A further advantage of this configuration is that independent beam tilting of downlink transmit and uplink receive channels assist in minimizing RF coupling of potential PIM sources which may be close to, within the near-field of, and/or in front of the antennas. This example is illustrated in in the example base station system (899) of FIG. 8.

Figure 8:
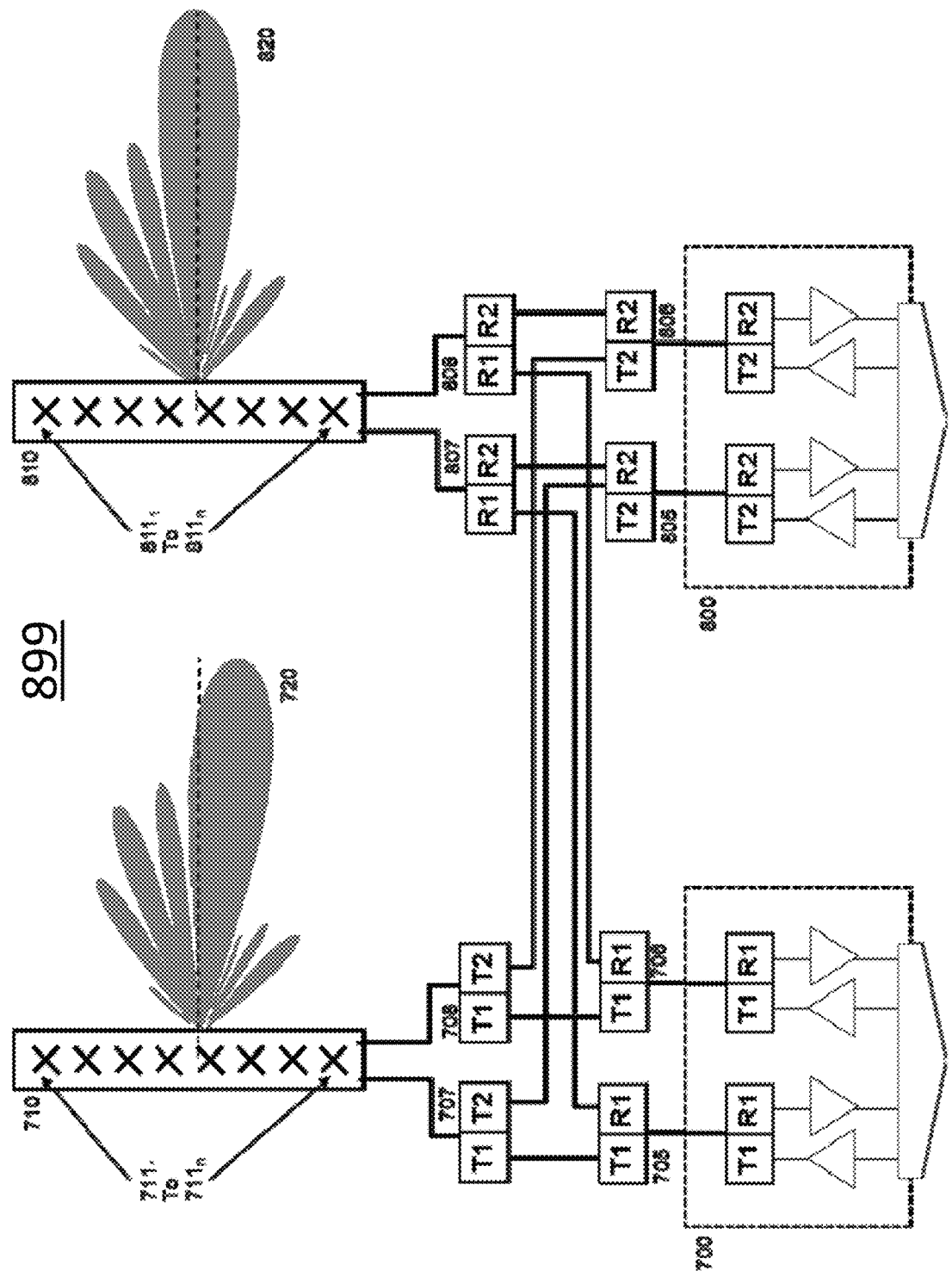
FIG. 8 illustrates an example configuration for providing independent uplink and downlink tilt for multiple base station radios.

Two duplexed base station radios (700, 800), designed to operate in a first band of frequencies and a second band of frequencies with at least two duplexed RF connections per base station radio, is shown in FIG. 8. The fourth example comprises duplexing filters (705, 706) to provide component downlink and uplink signal sub-bands associated with the first base station radio (700), and duplexing filters (805, 806) to provide component downlink and uplink signal sub-bands associated with the second base station radio (800). The respective downlink sub-band component signals are combined using duplexing filters (707, 708), where the combined downlink signals are connected to a first antenna array (710) comprising an array of n antenna elements (711$_1$-711$_n$), and first antenna array (710) having a means for varying the elevation plane main beam tilt angle (720) (such as a feed network illustrated in FIG. 5, or the like). The respective uplink sub-band component signals are split using duplexing filters (807, 808), where the combined uplink signals are received from a second antenna array (810) comprising an array of n antenna elements (811$_1$-811$_n$), and second antenna array (810) having a means for varying the elevation plane main beam tilt angle (820) (such as feed network illustrated in FIG. 5, or the like).

The configuration described in the fourth example may also incorporate antenna feed networks which minimize RF coupling as described in the second example, thereby bringing together the benefits of uplink and downlink independent tilting, suppression of near-field RF coupling, and minimizing and/or reducing the number of physical antennas utilized at a base station site.

While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof.

Aspects of various embodiments are specified in the claims. Those and other aspects of various embodiments are specified in the following numbered clauses.
1. A base station system comprising:
  at least one base station radio;
  at least one antenna, the at least one antenna including at least a first antenna comprising a substantially linear array of antenna elements arranged in a substantially vertical plane; and
  at least one antenna feed network for distributing radio frequency (RF) signals as component RF signals across the linear array of antenna elements of the at least the first antenna to form at least one beam in an elevation plane;
    wherein the at least the one antenna feed network applies amplitude and phase weights to the component RF signals, wherein the amplitude and phase weights are selected to minimize RF coupling between the at least the first antenna and passive intermodulation sources in a near-field of the at least the first antenna.
2. The base station system of clause 1, wherein the amplitude and phase weights are further selected such that a far-field beam pattern of the at least one beam is for transmitting or receiving signals in a cellular network.
3. The base station system of clause 1, wherein the at least one antenna is for deployment on a rooftop of a building.
4. The base station system of clause 3, wherein the at least one antenna is for deployment above a rooftop edge of the rooftop or set back from the rooftop edge.
5. The base station system of clause 3, wherein the at the least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different.
6. The base station system of clause 5, wherein a difference between the first tilt angle of the main receive beam and the second tilt angle of the main transmit beam provides a reduction in the RF coupling between the at least the first antenna and the passive intermodulation sources in the near-field of the at least the first antenna.
7. The base station system of clause 6, wherein the passive intermodulation sources include sources that fall within an angle included within a main transmit beam of the at least one beam.
8. The base station system of clause 5, wherein the first tilt angle is directed at an angle to reduce RF coupling between the downlink signals and the uplink signals with the passive intermodulation sources, wherein the passive intermodulation sources are located on the rooftop.
9. The base station system of clause 5, where the at least one antenna feed network comprises:
  a first antenna feed network associated with the at least the first antenna for receiving the uplink signals; and
  a second antenna feed network associated with a second antenna of the at least one antenna, for transmitting the downlink signals.
10. The base station system of clause 5, where the at least one antenna feed network comprises:
  a first antenna feed network associated with the at least the first antenna for receiving the uplink signals; and
  a second antenna feed network associated with the at least the first antenna, for transmitting the downlink signals.
11. The base station system of clause 5, where the amplitude and phase weights are selected to jointly minimize RF coupling between the at least the first antenna and passive intermodulation sources in a near-field of the at least the first antenna and to minimize far-field elevation plane sidelobes below at least one of the main transmit beam or the main receive beam.
12. The base station system of clause 5, where the at least one base station radio comprises at least two base station radios operating on different frequencies.
13. The base station system of clause 12, where the at least two base station radios operating on the different frequencies have downlink transmission frequencies which, when coupled with an external passive intermodulation source of the passive intermodulation sources, cause the external passive intermodulation source to generate inter-modulated spectral products that are co-channel with an uplink frequency band of at least one of the at least two base station radios.
14. The base station system of clause 1, wherein the passive intermodulation sources generate inter-modulated spectral products when interacting with downlink signals transmitted via the at least one beam of the at least the first antenna.

15. The base station system of clause 1, wherein the amplitude and phase weights are selected in accordance with an optimization algorithm.

16. The base station system of clause 1, wherein the amplitude and phase weights are selected to minimize the RF coupling between the at least the first antenna and passive intermodulation sources in an area of the near-field of the at least the first antenna below a main beam of the at least one beam.

17. The base station system of clause 16, wherein the area is between 0 to 6 meters in front of and below the at least the first antenna.

18. The base station system of clause 16, wherein the area is between 0 to 10 meters in front of and below the at least the first antenna.

19. The base station system of clause 1, wherein the amplitude and phase weights are selected to minimize the RF coupling between the at least the first antenna and the passive intermodulation sources in the near-field of the at least the first antenna, and wherein the amplitude and phase weights are not selected for optimization of a far-field sidelobe suppression below a main beam of the at least one beam.

20. The base station system of clause 19, wherein the at the least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different.

21. The base station system of clause 20, wherein a difference between the first tilt angle of the main receive beam and the second tilt angle of the main transmit beam provides a reduction in the RF coupling between the at least the first antenna and the passive intermodulation sources in the near-field of the at least the first antenna.

22. The base station system of clause 21, wherein the passive intermodulation sources include sources that fall within an angle included within a main transmit beam of the at least one beam.

23. The base station system of clause 20, where the at least one antenna feed network comprises:
    a first antenna feed network associated with the at least the first antenna for receiving the uplink signals; and
    a second antenna feed network associated with a second antenna of the at least one antenna, for transmitting the downlink signals.

24. The base station system of clause 20, where the at least one antenna feed network comprises:
    a first antenna feed network associated with the at least the first antenna for receiving the uplink signals; and
    a second antenna feed network associated with the at least the first antenna, for transmitting the downlink signals.

25. The base station system of clause 19, where the at least one base station radio comprises at least two base station radios operating on different frequencies.

26. The base station system of clause 25, where the at least two base station radios operating on the different frequencies have downlink transmission frequencies which, when coupled with an external passive intermodulation source of the passive intermodulation sources, cause the external passive intermodulation source to generate inter-modulated spectral products that are co-channel with an uplink frequency band of at least one of the at least two base station radios.

27. A method for operating a base station system, comprising:
    obtaining a radio frequency (RF) signal for transmission via at least a first antenna of the base station system comprising a substantially linear array of antenna elements arranged in substantially a vertical plane;
    processing the RF signal via at least one antenna feed network for distributing the (RF) signals as component RF signals across the linear array of antenna elements of the at least the first antenna to form at least one beam in an elevation plane, wherein the at least the one antenna feed network applies amplitude and phase weights to the component RF signals, wherein the amplitude and phase weights are selected to minimize RF coupling between the at least the first antenna and passive intermodulation sources in a near-field of the at least the first antenna; and
    transmitting the component RF signals via the at least the first antenna.

28. The method of clause 27, further comprising:
    selecting the amplitude and phase weights to minimize the RF coupling between the at least a first antenna and the passive intermodulation sources in the near-field of the at least the first antenna; and
    configuring the at least one antenna feed network to apply the amplitude and phase weights.

29. The method of clause 27, wherein the RF signal is obtained via at least one base station radio of the base station system.

30. The method of clause 27, wherein the amplitude and phase weights are further selected such that a far-field beam pattern of the at least one beam is for transmitting or receiving signals in a cellular network.

31. The method of clause 27, wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different.

32. The method of clause 31, wherein a difference between the first tilt angle of the main receive beam and the second tilt angle of the main transmit beam provides a reduction in the RF coupling between the at least the first antenna and the passive intermodulation sources in the near-field of the at least the first antenna.

33. The method of clause 31, further comprising:
    selecting the first tilt angle and the second tilt angle; and
    configuring the at least one antenna feed network to provide the first electrical tilt to set the first tilt angle and to provide the second electrical tilt to set the second tilt angle.

34. A method for operating a base station system, comprising:
    receiving a radio frequency (RF) signal as component RF signals via at least a first antenna of the base station system comprising a substantially linear array of antenna elements arranged in substantially a vertical plane, wherein the component RF signals are received via at least one beam in an elevation plane;
    processing the component RF signals via at least one antenna feed network of the base station system for combining the component RF signals to generate the RF signal, wherein the at least the one antenna feed network applies amplitude and phase weights to the component RF signals, wherein the amplitude and phase weights are selected to shape the at least one beam to minimize RF coupling between the at least the first antenna and passive intermodulation sources in a near-field of the at least the first antenna; and passing the RF signal from the at least one antenna feed network to at least one base station radio of the base station system.

What is claimed is:

1. A base station system comprising:
   at least one base station radio;
   at least one antenna, the at least one antenna including at least a first antenna comprising a substantially linear array of antenna elements arranged in substantially a vertical plane; and
   at least one antenna feed network for distributing radio frequency (RF) signals as component RF signals across the linear array of antenna elements of the at least the first antenna to form at least one beam in an elevation plane;
   wherein the at least one antenna feed network applies amplitude and phase weights to the component RF signals, wherein the amplitude and phase weights are selected to minimize RF coupling between the at least the first antenna and passive intermodulation sources in an area of a near-field of the at least the first antenna below a main beam of the at least one beam.

2. The base station system of claim 1, wherein the at least one antenna is for deployment above a rooftop edge of a rooftop of a building or set back from the rooftop edge.

3. The base station system of claim 2, wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different.

4. The base station system of claim 3, where the at least one antenna feed network comprises:
   a first antenna feed network associated with the at least the first antenna for receiving the uplink signals; and
   a second antenna feed network associated with a second antenna of the at least one antenna, for transmitting the downlink signals.

5. The base station system of claim 3, where the at least one antenna feed network comprises:
   a first antenna feed network associated with the at least the first antenna for receiving the uplink signals; and
   a second antenna feed network associated with the at least the first antenna, for transmitting the downlink signals.

6. The base station system of claim 3, where the at least one base station radio comprises at least two base station radios operating on different frequencies.

7. The base station system of claim 1, wherein the area is between 0 to 10 meters in front of and below the at least the first antenna.

8. A base station system comprising:
   at least one base station radio;
   at least one antenna, the at least one antenna including at least a first antenna comprising a substantially linear array of antenna elements arranged in substantially a vertical plane; and
   at least one antenna feed network for distributing radio frequency (RF) signals as component RF signals across the linear array of antenna elements of the at least the first antenna to form at least one beam in an elevation plane;
   wherein the at least one antenna feed network applies amplitude and phase weights to the component RF signals, wherein the amplitude and phase weights are selected to minimize RF coupling between the at least the first antenna and passive intermodulation sources in a near-field of the at least the first antenna;
   wherein the at least one antenna is for deployment above a rooftop edge of a rooftop of a building or set back from the rooftop edge;
   wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different; and
   wherein a difference of the first tilt angle of the main receive beam and the second tilt angle of the main transmit beam provides a reduction in the RF coupling between the at least the first antenna and the passive intermodulation sources in the near-field of the at least the first antenna.

9. A base station system comprising:
   at least one base station radio;
   at least one antenna, the at least one antenna including at least a first antenna comprising a substantially linear array of antenna elements arranged in substantially a vertical plane; and
   at least one antenna feed network for distributing radio frequency (RF) signals as component RF signals across the linear array of antenna elements of the at least the first antenna to form at least one beam in an elevation plane;
   wherein the at least one antenna feed network applies amplitude and phase weights to the component RF signals, wherein the amplitude and phase weights are selected to minimize RF coupling between the at least the first antenna and passive intermodulation sources in a near-field of the at least the first antenna;
   wherein the at least one antenna is for deployment above a rooftop edge of a rooftop of a building or set back from the rooftop edge;
   wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different; and
   wherein the first tilt angle for reception of uplink signals is directed at an angle to reduce RF coupling between the downlink signals and the uplink signals with the passive intermodulation sources, wherein the passive intermodulation sources are located on the rooftop.

10. A base station system comprising:
    at least one base station radio;
    at least one antenna, the at least one antenna including at least a first antenna comprising a substantially linear array of antenna elements arranged in substantially a vertical plane; and
    at least one antenna feed network for distributing radio frequency (RF) signals as component RF signals across the linear array of antenna elements of the at least the first antenna to form at least one beam in an elevation plane;

wherein the at least one antenna feed network applies amplitude and phase weights to the component RF signals, wherein the amplitude and phase weights are selected to minimize RF coupling between the at least the first antenna and passive intermodulation sources in a near-field of the at least the first antenna;

wherein the at least one antenna is for deployment above a rooftop edge of a rooftop of a building or set back from the rooftop edge;

wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different; and where the amplitude and phase weights are selected to jointly minimize RF coupling between the at least the first antenna and the passive intermodulation sources in the near-field of the at least the first antenna and to minimize far-field elevation plane sidelobes below at least one of: the main transmit beam or the main receive beam.

11. A base station system comprising:
at least one base station radio;
at least one antenna, the at least one antenna including at least a first antenna comprising a substantially linear array of antenna elements arranged in substantially a vertical plane; and
at least one antenna feed network for distributing radio frequency (RF) signals as component RF signals across the linear array of antenna elements of the at least the first antenna to form at least one beam in an elevation plane;
wherein the at least one antenna feed network applies amplitude and phase weights to the component RF signals, wherein the amplitude and phase weights are selected to minimize RF coupling between the at least the first antenna and passive intermodulation sources in a near-field of the at least the first antenna;
wherein the at least one antenna is for deployment above a rooftop edge of a rooftop of a building or set back from the rooftop edge;
wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different;
where the at least one base station radio comprises at least two base station radios operating on different frequencies; and
where the at least two base station radios operating on the different frequencies have downlink transmission frequencies which, when coupled with an external passive intermodulation source of the passive intermodulation sources, would cause the external passive intermodulation source to generate inter-modulated spectral products that are co-channel with an uplink frequency band of at least one of the at least two base station radios.

12. A base station system comprising:
at least one base station radio;
at least one antenna, the at least one antenna including at least a first antenna comprising a substantially linear array of antenna elements arranged in substantially a vertical plane; and
at least one antenna feed network for distributing radio frequency (RF) signals as component RF signals across the linear array of antenna elements of the at least the first antenna to form at least one beam in an elevation plane;
wherein the at least one antenna feed network applies amplitude and phase weights to the component RF signals, wherein the amplitude and phase weights are selected to minimize RF coupling between the at least the first antenna and passive intermodulation sources in a near-field of the at least the first antenna; and wherein the amplitude and phase weights are not selected for optimization of a far-field sidelobe suppression below a main beam of the at least one beam.

13. The base station system of claim 12, wherein the at least one antenna feed network provides a first electrical tilt to set a first tilt angle of a main receive beam of the at least one beam for reception of uplink signals from mobile terminals, and provides a second electrical tilt to set a second tilt angle of a main transmit beam of the at least one beam for transmission of downlink signals to mobile terminals, wherein the first tilt angle and the second tilt angle are different.

14. The base station system of claim 13, wherein a difference of the first tilt angle of the main receive beam and the second tilt angle of the main transmit beam provides a reduction in the RF coupling between the at least the first antenna and the passive intermodulation sources in the near-field of the at least the first antenna.

15. The base station system of claim 14, wherein the passive intermodulation sources include sources that fall within an angle included within the main transmit beam of the at least one beam.

16. The base station system of claim 13, where the at least one antenna feed network comprises:
a first antenna feed network associated with the at least the first antenna for receiving the uplink signals; and
a second antenna feed network associated with a second antenna of the at least one antenna, for transmitting the downlink signals.

17. The base station system of claim 13, where the at least one antenna feed network comprises:
a first antenna feed network associated with the at least the first antenna for receiving the uplink signals; and
a second antenna feed network associated with the at least the first antenna, for transmitting the downlink signals.

18. The base station system of claim 12, where the at least one base station radio comprises at least two base station radios operating on different frequencies.

19. The base station system of claim 18, where the at least two base station radios operating on the different frequencies have downlink transmission frequencies which, when coupled with an external passive intermodulation source of the passive intermodulation sources, would cause the external passive intermodulation source to generate inter-modulated spectral products that are co-channel with an uplink frequency band of at least one of the at least two base station radios.

* * * * *